(12) United States Patent
Wu et al.

(10) Patent No.: US 9,590,676 B2
(45) Date of Patent: Mar. 7, 2017

(54) SIGNAL RECEIVING APPARATUS AND SIGNAL RECEIVING METHOD

(71) Applicant: MEDIATEK INC., Hsin-Chu (TW)

(72) Inventors: Chia-Hsin Wu, New Taipei (TW); Yi-An Li, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 30 days.

(21) Appl. No.: 14/664,922

(22) Filed: Mar. 23, 2015

(65) Prior Publication Data
US 2016/0142082 A1 May 19, 2016

Related U.S. Application Data

(60) Provisional application No. 62/081,010, filed on Nov. 18, 2014.

(51) Int. Cl.
*H04B 1/10* (2006.01)
*H04B 1/18* (2006.01)

(52) U.S. Cl.
CPC ..................... *H04B 1/18* (2013.01)

(58) Field of Classification Search
CPC ...... H03D 7/1466; H03D 7/1491; H03F 1/02; H03F 1/24; H03F 1/52; H03F 3/21; H03F 3/45; H03F 3/193; H04B 1/00; H04B 1/10; H04B 1/12; H04B 1/16; H04B 1/40; H04B 7/00; H04B 7/005; H04B 15/00; H04B 17/00; H04L 1/00; H04L 1/0036; H04L 25/06; H04L 25/08; H04L 25/14
USPC ...... 330/9, 98, 107, 253, 260, 310; 375/346, 375/350; 455/73, 232.1, 296, 315, 326
See application file for complete search history.

(56) References Cited

U.S. PATENT DOCUMENTS

| | | | | |
|---|---|---|---|---|
| 6,201,442 B1 * | 3/2001 | James | ..................... | H03F 1/083 330/107 |
| 7,173,486 B1 * | 2/2007 | Sutardja | ................... | H03F 1/08 250/214 A |
| 7,276,969 B1 * | 10/2007 | Aram | ....................... | H03F 1/08 330/253 |

(Continued)

OTHER PUBLICATIONS

Shaeffer, A 1.5-V, 1.5-GHz CMOS Low Noise Amplifier, IEEE Journal of Solid-State Circuits, vol. 32, No. 5, pp. 745-759, May 1997.

(Continued)

*Primary Examiner* — Shawkat M Ali
(74) *Attorney, Agent, or Firm* — Winston Hsu; Scott Margo

(57) ABSTRACT

A signal receiving apparatus includes: a first amplifying device, a second amplifying device, a feedback device, and a mixing device, wherein the mixing device is a passive mixer, the second amplifying device is arranged to provide an input impedance looking into an input terminal of the second amplifying device to fall within a first impedance range when the second amplifying device operates in a first frequency range, the second amplifying device is arranged to provide the input impedance looking into the input terminal of the second amplifying device to fall within a second impedance range when the second amplifying device operates in a second frequency range, the second frequency range is different from the first frequency range, and the second impedance range is different from the first impedance range.

24 Claims, 8 Drawing Sheets

(56) References Cited

U.S. PATENT DOCUMENTS

| | | | | |
|---|---|---|---|---|
| 7,558,014 B1* | 7/2009 | Voo | ............................ | G11B 5/02 |
| | | | | 330/282 |
| 7,676,206 B2* | 3/2010 | Ragan | ........................ | H04B 1/18 |
| | | | | 455/213 |
| 9,031,529 B2* | 5/2015 | Murphy | ..................... | H04B 1/30 |
| | | | | 455/323 |
| 2008/0218273 A1* | 9/2008 | Uehara | ................ | H03F 3/45197 |
| | | | | 330/306 |
| 2009/0088122 A1* | 4/2009 | Xu | ........................ | H03D 7/1441 |
| | | | | 455/333 |
| 2009/0115528 A1* | 5/2009 | Wang | ......................... | H03F 1/08 |
| | | | | 330/293 |
| 2011/0230151 A1* | 9/2011 | Tsai | ...................... | H04B 1/0475 |
| | | | | 455/150.1 |
| 2012/0149321 A1* | 6/2012 | Montalvo | ................. | H04B 1/30 |
| | | | | 455/232.1 |
| 2014/0355728 A1* | 12/2014 | Liao | .......................... | H04B 1/10 |
| | | | | 375/346 |

OTHER PUBLICATIONS

He, A Compact SAW-less Multiband WCDMA/GPS Receiver Front-End with Translational Loop for Input Matching, ISSCC 2011 / Session 21 / Cellular / 21.5, pp. 372-373 and one page showing Figure 21.5.7.

Andrews, A Passive Mixer-First Receiver With Digitally Controlled and Widely Tunable RF Interface, IEEE Journal of Solid-State Circuits, vol. 45, No. 12, pp. 2696-2708, Dec. 2010.

Beffa, A Receiver for WCDMA/EDGE Mobile Phones with Inductorless Front-End in 65nm CMOS, ISSCC 2011 / Session 21 / Cellular / 21.4, pp. 370-371 and one page showing Figure 21.4.7.

* cited by examiner

SIGNAL RECEIVING APPARATUS AND SIGNAL RECEIVING METHOD

CROSS REFERENCE TO RELATED APPLICATIONS

This application claims the benefit of U.S. provisional application No. 62/081,010, filed on Nov. 18, 2014 and incorporated herein by reference.

BACKGROUND

The present invention relates to a signal receiving apparatus and a related method, and more particularly to a mixer-first low-cost signal receiver, and method thereof.

In a wireless communications system, a receiver is used to receive a wireless signal having a specific bandwidth. To precisely receive the wireless signal, the receiver may need to have the ability to filter out the unwanted signal outside the specific bandwidth before converting the inputting signal into digital domain. Meanwhile, the receiver should not provide too much noise to the inputting signal. Otherwise, the signal-to-noise ratio (SNR) of the inputting signal will degrade. Conventionally, a low-noise amplifier is used to amplify the wireless signal, and a large capacitor is used to provide a sharp filtering effect for the receiver. However, the low-noise amplifier may consume a large amount of power of the receiver when the gain is high. When the gain is high, the linearity is another problem for the low-noise amplifier because the inputting signal may be distorted by the non-linear effect of the low-noise amplifier. On the other hand, the large capacitor may reduce the gain in the required in-band frequency of the receiver. In other words, the large capacitor may cause the gain response of the receiver to be too sharp such that the signal-to-noise ratio of the inputting signal degrades at the channel edge. Moreover, the large capacitor also occupies a large chip area of the receiver.

Therefore, providing a low cost receiver having flat in-band response and sharp adjacent-band rejection is an urgent problem in the field of wireless communications system.

SUMMARY

One of the objectives of the present embodiment is to provide a mixer-first low-cost signal receiver, and method thereof.

According to a first embodiment of the present invention, a signal receiving apparatus is disclosed. The signal receiving apparatus comprises a first amplifying device, a second amplifying device, a feedback device, and a mixing device. The first amplifying device has an input terminal and an output terminal. The second amplifying device has an input terminal and an output terminal, wherein the input terminal of the second amplifying device is coupled to the output terminal of the first amplifying device. The feedback device is coupled between the output terminal of the second amplifying device and the input terminal of the first amplifying device. The mixing device has an input terminal coupled to a chip connecting port and an output terminal coupled to the input terminal of the first amplifying device, wherein the mixing device is a passive mixer, the second amplifying device is arranged to provide an input impedance looking into the input terminal of the second amplifying device to fall within a first impedance range when the second amplifying device operates in a first frequency range, the second amplifying device is arranged to provide the input impedance looking into the input terminal of the second amplifying device to fall within a second impedance range when the second amplifying device operates in a second frequency range, the second frequency range is different from the first frequency range, and the second impedance range is different from the first impedance range.

According to a second embodiment of the present invention, a signal receiving method is disclosed. The signal receiving method comprises the steps of: providing a first amplifying device having an input terminal and an output terminal; providing a second amplifying device having an input terminal and an output terminal, wherein the input terminal of the second amplifying device is coupled to the output terminal of the first amplifying device; providing a feedback device to couple between the output terminal of the second amplifying device and the input terminal of the first amplifying device; providing a mixing device having an input terminal coupled to a chip connecting port and an output terminal coupled to the input terminal of the first amplifying device, wherein the mixing device is a passive mixer; controlling the second amplifying device to provide an input impedance looking into the input terminal of the second amplifying device to fall within a first impedance range when the second amplifying device operates in a first frequency range; and controlling the second amplifying device to provide the input impedance looking into the input terminal of the second amplifying device to fall within a second impedance range when the second amplifying device operates in a second frequency range; wherein the second frequency range is different from the first frequency range, and the second impedance range is different from the first impedance range.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . .". Also, the term "couple" is intended to mean either an indirect or direct electrical connection. Accordingly, if one device is coupled to another device, that connection may be through a direct electrical connection, or through an indirect electrical connection via other devices and connections.

Figure 1:
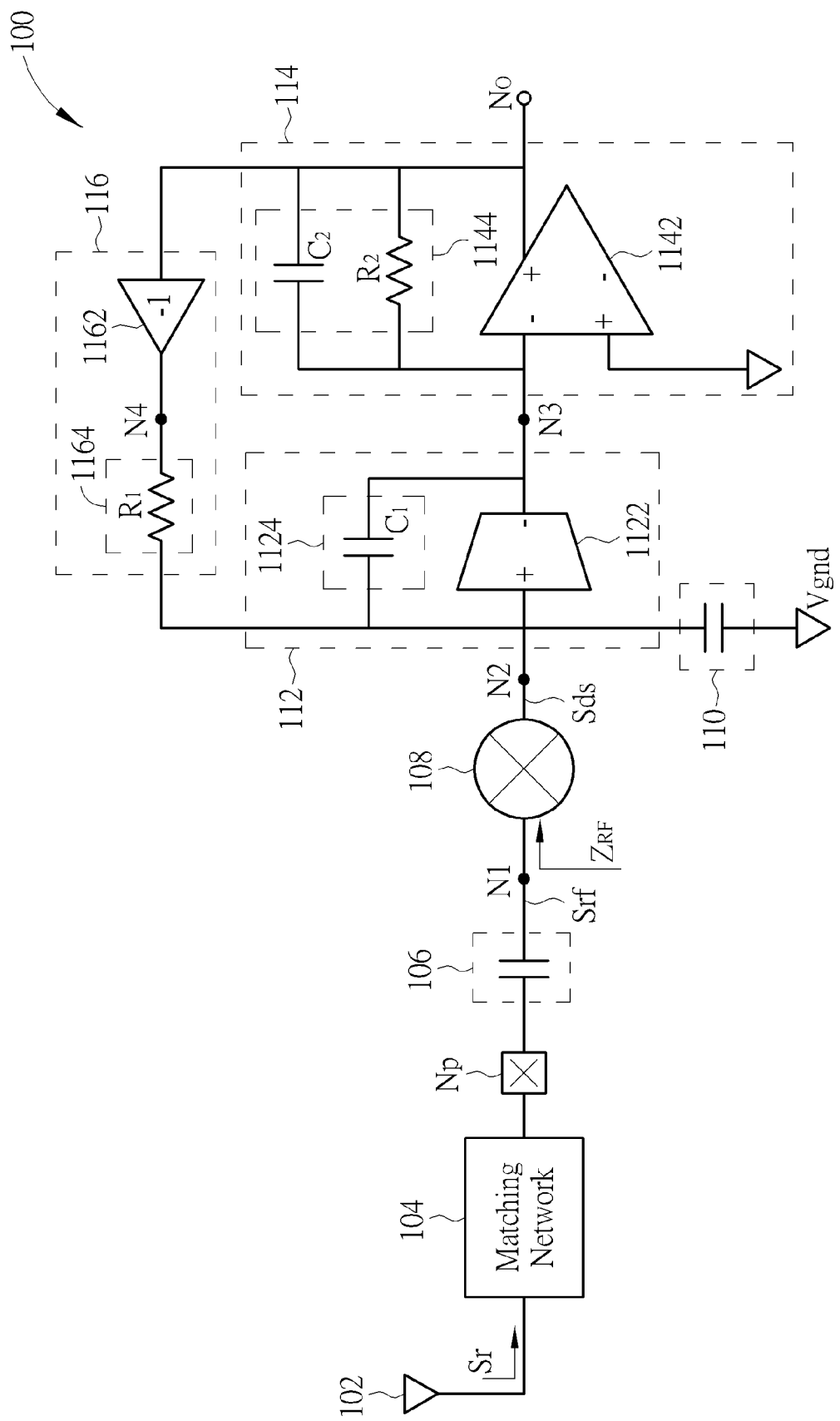
FIG. 1 is a diagram illustrating a signal receiving apparatus according to an embodiment of the present invention.

Please refer to FIG. 1, which is a diagram illustrating a signal receiving apparatus 100 according to an embodiment of the present invention. The signal receiving apparatus 100 is a wireless signal receiver. For example, the signal receiving apparatus 100 is a receiver in the LTE (Long Term Evolution) communications system. The signal receiving apparatus 100 comprises an antenna 102, a matching network 104, a capacitive device 106, a mixing device 108, a capacitive device 110, a first amplifying device 112, a second amplifying device 114, and a feedback device 116. The antenna 102 is arranged to receive a wireless signal Sr. The matching network 104 has a first terminal coupled to the antenna 102 and a second terminal coupled to a chip connecting port Np. The capacitive device 106 has a first terminal coupled to the chip connecting port Np and a second terminal coupled to an input terminal N1 of the mixing device 108. The mixing device 108 is arranged to down-convert the receiving RF (Radio frequency) signal Srf into a down-convert signal Sds at the output terminal N2. The capacitive device 110 has a first terminal coupled to the output terminal N2 of the mixing device 108 and a second terminal coupled to a reference voltage. In this embodiment, the reference voltage is a ground voltage Vgnd. In addition, the circuit components in the right side of the chip connecting port Np are implemented as a single-chip. The circuit components (i.e. the antenna 102 and the matching network 104) in the left side of the chip connecting port Np are external to the single-chip. Therefore, the chip connecting port Np can be regarded as an input port of the chip.

The first amplifying device 112 has an input terminal coupled to the output terminal N2 of the mixing device 108. The second amplifying device 114 has an input terminal N3 coupled to the output terminal of the first amplifying device 112. The feedback device 116 is coupled between the output terminal No of the second amplifying device 114 and the input terminal N2 of the first amplifying device 112.

The first amplifying device 112 comprises a trans-conductance circuit 1122 and a feedback circuit 1124. The trans-conductance circuit 1122 is arranged to provide a trans-conductance gain $g_m$ from the input terminal N2 of the first amplifying device 112 to the output terminal N3 of the first amplifying device 112. The feedback circuit 1124 is coupled between the input terminal N2 and the output terminal N3 of the first amplifying device 112. According to this embodiment, the feedback circuit 1124 is a capacitor having capacitance $C_1$. However, this is not a limitation of the present invention. The feedback circuit 1124 may be a combination circuit of capacitive elements, inductive elements, resistive elements, and/or transistors.

The feedback device 116 comprises an inverting circuit 1162 and a resistive circuit 1164. The inverting circuit 1162 has an input terminal coupled to the output terminal No of the second amplifying device 114. The resistive circuit 1164 has a first terminal coupled to an output terminal N4 of the inverting circuit 1162 and a second terminal coupled to the input terminal N2 of the first amplifying device 112. According to this embodiment, the resistive circuit 1164 is a resistor having resistance $R_1$. However, this is not a limitation of the present invention. The feedback device 116 may be a combination circuit of capacitive elements, inductive elements, resistive elements, and/or transistors.

The second amplifying device 114 comprises a trans-impedance circuit 1142 and a feedback circuit 1144. The trans-impedance circuit 1142 is arranged to provide a trans-impedance gain from the input terminal N3 of the second amplifying device 114 to the output terminal No of the second amplifying device 114. The feedback circuit 1144 is coupled between the input terminal N3 and the output terminal No of the second amplifying device 1144. According to this embodiment, the feedback circuit 1144 comprises a capacitor with a capacitance $C_2$ and a resistor with a resistance $R_2$. The capacitor (i.e. $C_2$) is coupled between the input terminal N3 and the output terminal No of the second amplifying device 114. The resistor (i.e. $R_2$) is coupled between the input terminal N3 and the output terminal No of the second amplifying device 114. However, this is not a limitation of the present invention. The feedback circuit 1144 may be a combination circuit of capacitive elements, inductive elements, resistive elements, and/or transistors.

Figure 2:
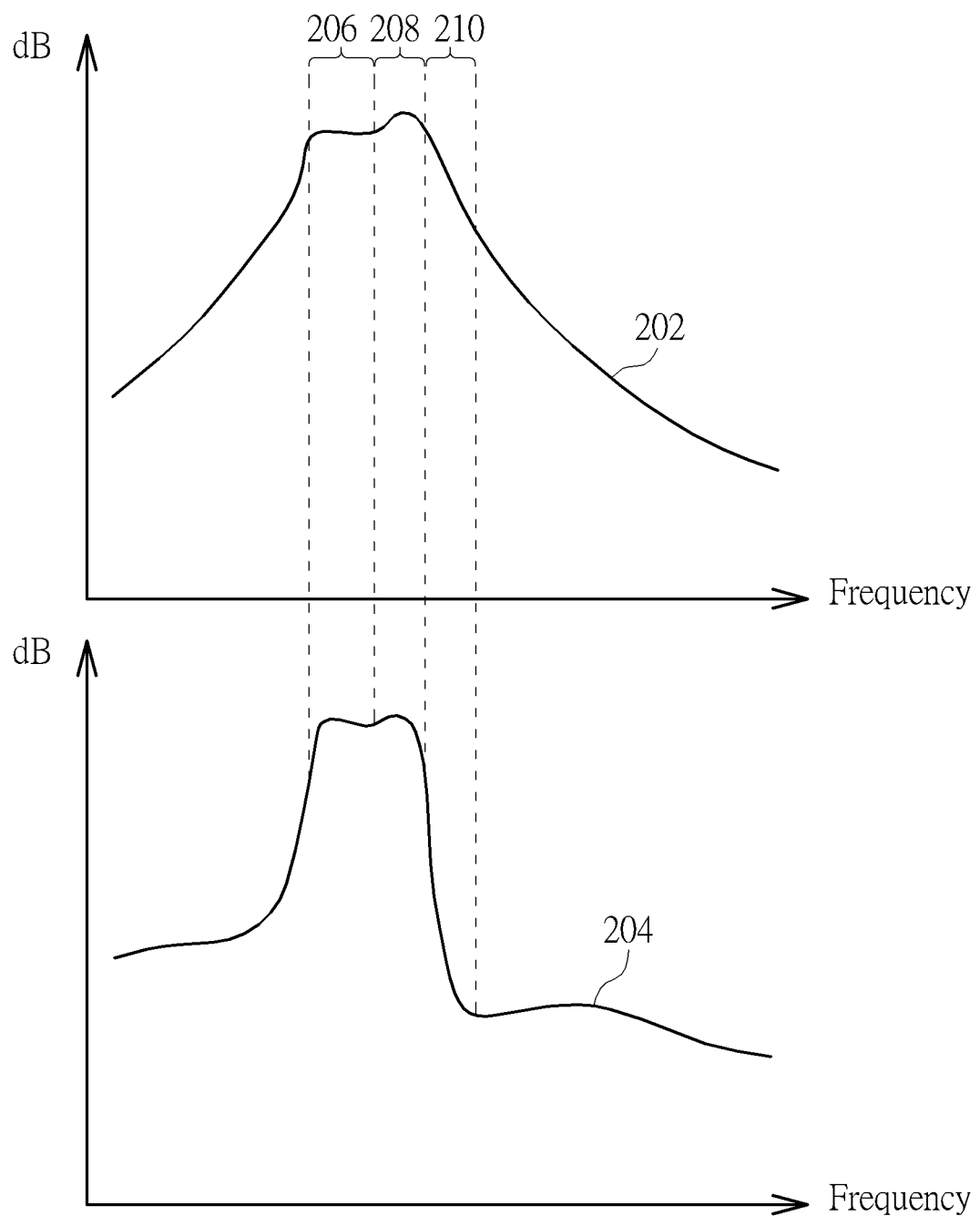
FIG. 2 is a diagram illustrating a frequency response of the signal receiving apparatus according to an embodiment of the present invention.

According to the embodiment, the signal receiving apparatus 100 has flat in-band response and sharp adjacent-band rejection as shown in FIG. 2. FIG. 2 is a diagram illustrating a frequency response of the signal receiving apparatus 100 according to an embodiment of the present invention. The upper curve 202 represents the frequency response from the antenna 102 to the second amplifying device 114. The lower curve 204 represents the frequency response from the first amplifying device 112 to the second amplifying device 114. It can be seen that the gain is kept flat in the in-band frequency 206 and the mid-band frequency 208, and the gain has a sharp drop in the near-band frequency 210. Accordingly, the SNR of the signal in the channel edge (i.e. the mid-band frequency 208) is not degraded while the signal in the adjacent channel (i.e. the near-band frequency 210) can be greatly rejected. The reason to have the above advantages is that the first amplifying device 112 in combination with the second amplifying device 114 has created a low input impedance at the in-band and a high input impedance at the mid-band. Therefore, the gain is kept flat in the in-band frequency 206 and the mid-band frequency 208 and has a sharp drop in the near-band frequency 210.

Moreover, the signal receiving apparatus 100 also has a good noise performance when the matching network 104 is applied to match the impedance of the antenna 102 and the input impedance $Z_{RF}$ looking into the mixing device 108. This is because the resistance $R_1$ of the resistive circuit 1164 can be designed to have a large resistance, and the resistive circuit 1164 having the large resistance will induce less noise to the receiving signal.

Figure 3:
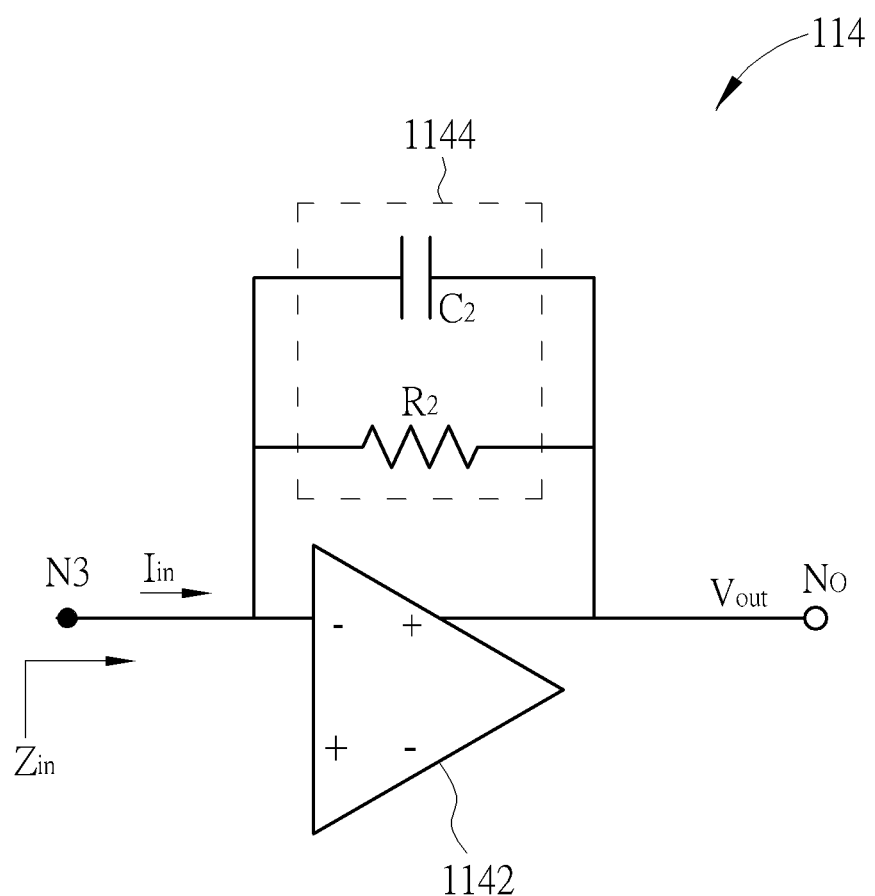
FIG. 3 is a diagram illustrating a second amplifying device according to an embodiment of the present invention.

More specifically, please refer to FIG. 3, which is a diagram illustrating the second amplifying device 114 alone, the second amplifying device 114 has an input impedance $Z_{in}$ looking into the input terminal N3 of the second amplifying device 114. The trans-impedance gain $V_{out}/I_{in}$ of the second amplifying device 114 and the input impedance $Z_{in}$ of the second amplifying device 114 can be expressed by the following equations (1) and (2) respectively:

$$\frac{V_{out}}{I_{in}} \cong \frac{R_2}{1+sR_2C_2}, \tag{1}$$

-continued $$Z_{in} = \frac{R_2}{1+A_0} \cdot \frac{1}{1+sR_2C_2} \cdot \frac{1+\frac{s}{\omega_0}}{1+\frac{s}{\omega_u}}. \quad (2)$$

$\omega_0$ represents the bandwidth of the trans-impedance circuit 1142. The term $1/(R_2C_2)$, i.e. $\omega_F$, represents the RC corner of gain response of the second amplifying device 114, $\omega_u$ represents the unity-gain bandwidth of the trans-impedance circuit 1142. Please refer to FIG. 4, which is a diagram illustrating a frequency response of the second amplifying device 114 according to an embodiment of the present invention. The curve 402 in the upper diagram represents the variation of trans-impedance gain $V_{out}/I_{in}$ in respect to frequency. The curve 404 in the lower diagram represents the variation of input impedance $Z_{in}$ in respect to frequency. When the frequency is in a first frequency range, i.e. the frequency lower than $\omega_0$, the value of the trans-impedance gain $V_{out}/I_{in}$ is substantially kept intact, and the value of the input impedance $Z_{in}$ is kept in low impedance range, i.e. falls within the first impedance range Z1. The first frequency range can be regarded as the in-band frequency of the signal receiving apparatus 100. When the frequency is in a second frequency range, i.e. the frequency between $\omega_0$ and $\omega_F$, the value of the trans-impedance gain $V_{out}/I_{in}$ is still substantially kept intact, but the value of the input impedance $Z_{in}$ monotonically increases in respect to frequency. In this embodiment, the input impedance $Z_{in}$ falls within the second impedance range Z2. The second frequency range can be regarded as the mid-band frequency of the signal receiving apparatus 100. Therefore, the impedance range (i.e. Z2) of the input impedance $Z_{in}$ in the second frequency range is larger than the impedance range (i.e. Z2) of the input impedance $Z_{in}$ in the first frequency range. Then, when the frequency is in a third frequency range, i.e. the frequency higher than $\omega_F$, the value of the trans-impedance gain $V_{out}/I_{in}$ decreases in respect to frequency, and the value of the input impedance $Z_{in}$ reaches the maximum value and then monotonically decreases in respect to frequency. The third frequency range can be regarded as the near-band frequency of the signal receiving apparatus 100. In other words, by using a trans-impedance amplifier (i.e. the second amplifying device 114), the input impedance $Z_{in}$ first keeps in low impedance level in low frequency range. Then, the input impedance $Z_{in}$ monotonically increases to reach the maximum value Zmax in the middle frequency range. Finally, the input impedance $Z_{in}$ monotonically decreases after reaching the maximum value Zmax in the high frequency range.

Figure 5:
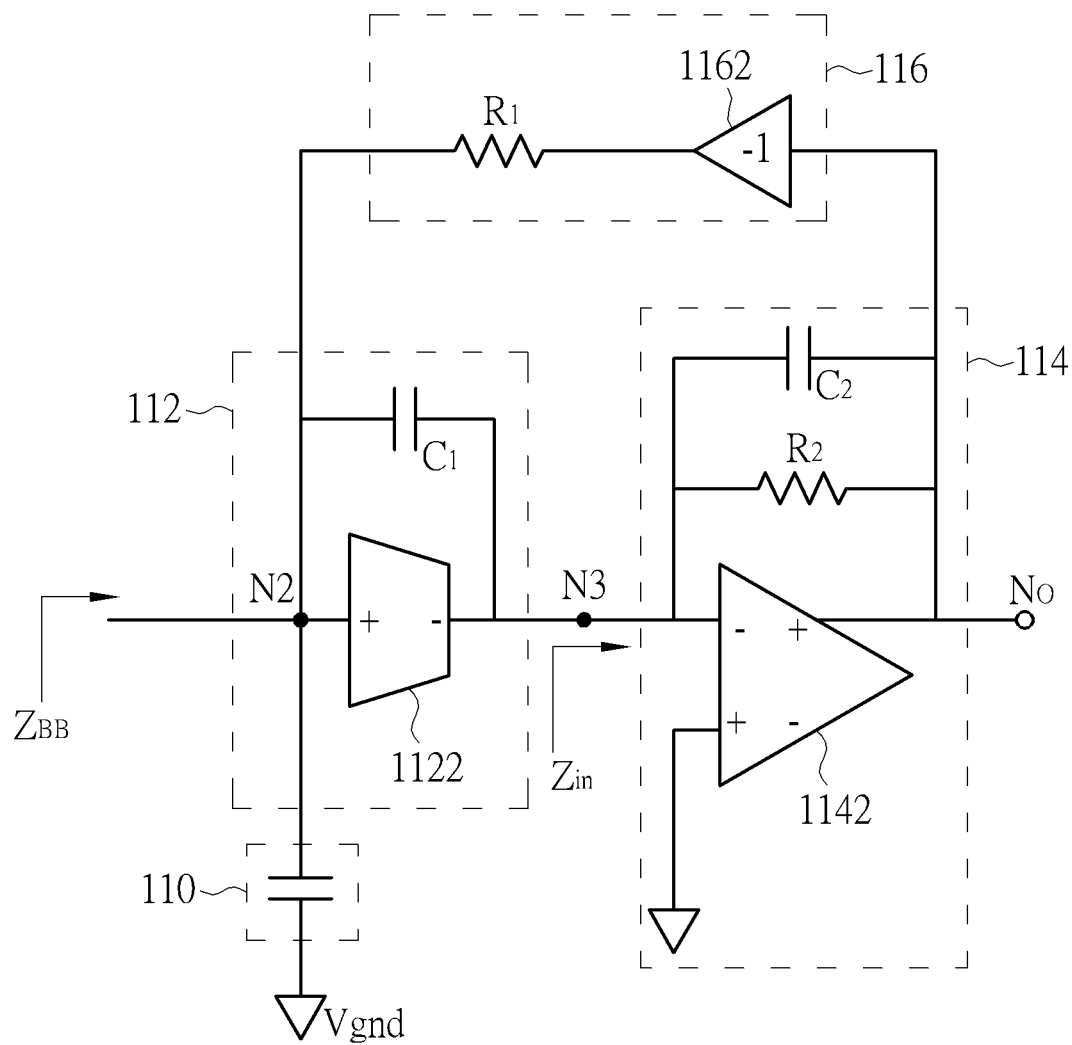
FIG. 5 is a diagram illustrating a combination circuit of a first amplifying device, a second amplifying device, a feedback device, and a capacitive device according to an embodiment of the present invention.
Figure 6:
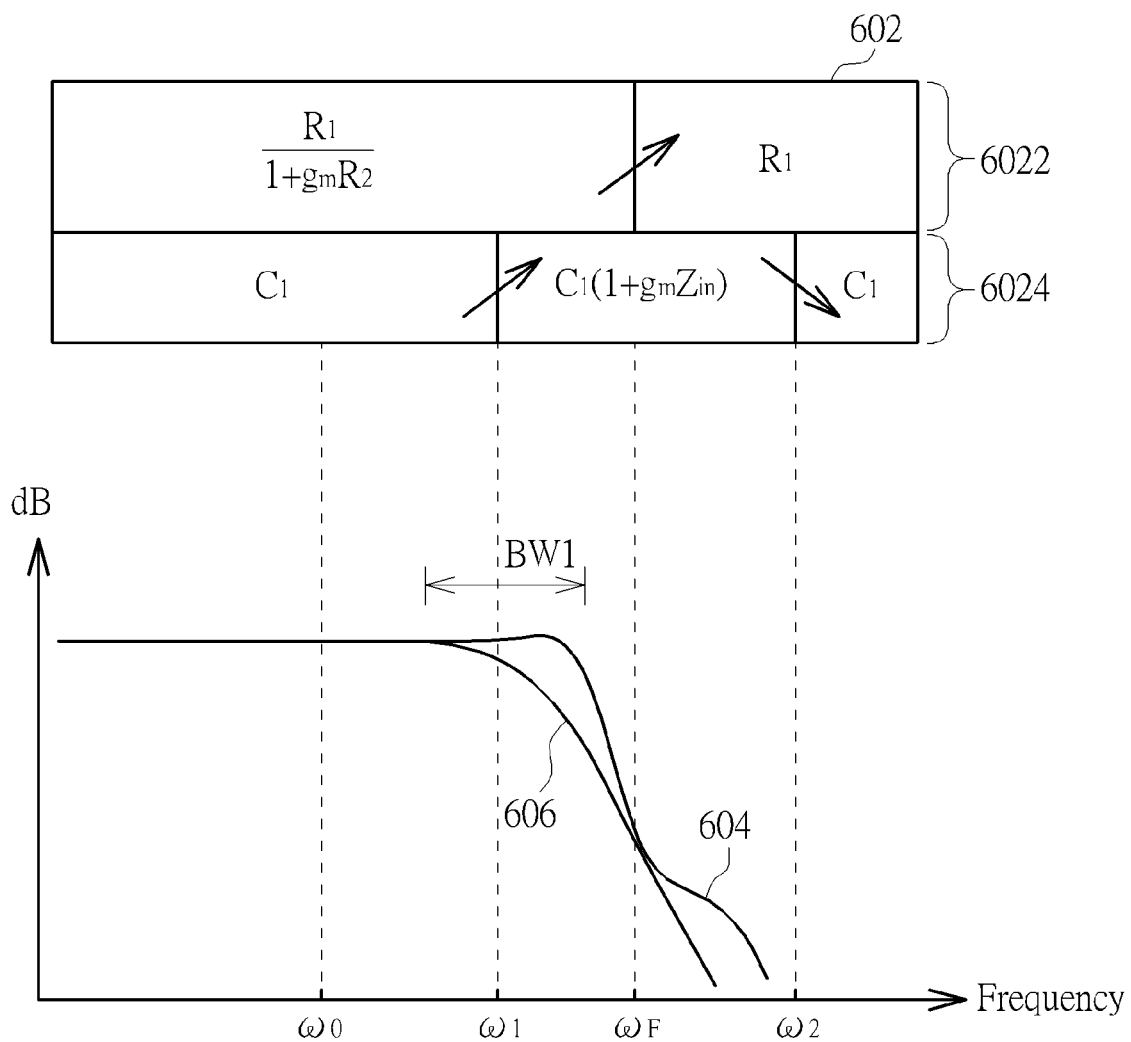
FIG. 6 is a diagram illustrating a frequency response of the combination circuit of the first amplifying device, the second amplifying device, the feedback device, and the capacitive device according to an embodiment of the present invention.

Therefore, when the first amplifying device 112, the feedback device 116, and the capacitive device 110 are combined with the second amplifying device 114, which is shown in FIG. 5, the input impedance $Z_{BB}$ looking into the input terminal N2 of the first amplifying device 112 may vary in response to the frequency. More specifically, please refer to FIG. 6, which is a diagram illustrating a frequency response of the combination circuit of the first amplifying device 112, the second amplifying device 114, the feedback device 116, and the capacitive device 110 according to an embodiment of the present invention. The upper row 6022 of the table 602 in FIG. 6 represents the variation of the input resistance (i.e. the real part of the input impedance $Z_{BB}$) looking into the input terminal N2 of the first amplifying device 112 in respect to frequency. The lower row 6024 of the table 602 in FIG. 6 represents the variation of the capacitance at the input terminal N2 of the first amplifying device 112 in respect to frequency. The curve 604 represents the gain response from the input terminal N2 to the output terminal No. As shown the upper row 6022 of FIG. 6, the value of the input resistance looking into the input terminal N2 can be expressed by the following equation (3) when the frequency is lower than $\omega_F$ (i.e. the in-band and mid-band frequency):

$$InputResistance = \frac{R_1}{1+g_mR_2}. \quad (3)$$

The value of the input resistance looking into the input terminal N2 can be expressed by the following equation (4) when the frequency is higher than $\omega_F$ (i.e. the near-band frequency):

$$InputResistance = R_1. \quad (4)$$

In other words, the input resistance looking into the input terminal N2 in the in-band and mid-band frequency is much lower than the input resistance in the near-band frequency because the value of the term $g_mR_2$ can be designed to have a large value. Therefore, the resistance $R_1$ of the resistive circuit 1164 can be designed to have a large resistance and still can be easily matched with the impedance of the antenna 102 via the matching network 104 in the in-band and mid-band frequency. It is noted that the larger the resistance $R_1$ may induce lower noise to the receiving signal.

Then, the lower row 6024 of FIG. 6, the value of the capacitance at the input terminal N2 can be expressed by the following equation (5) when the frequency is lower than a specific frequency $\omega_1$ in the mid-band frequency:

$$Capacitance = C_1. \quad (5)$$

The value of the capacitance at the input terminal N2 can be expressed by the following equation (6) when the frequency is between the specific frequency $\omega_1$ and another specific frequency $\omega_2$ in the near-band frequency:

$$Capacitance = C_1(1+g_mZ_{in}). \quad (6)$$

Then, the value of the capacitance at the input terminal N2 can be expressed by the following equation (7) when the frequency is higher than the specific frequency $\omega_2$:

$$Capacitance = C_1. \quad (7)$$

Figure 4:
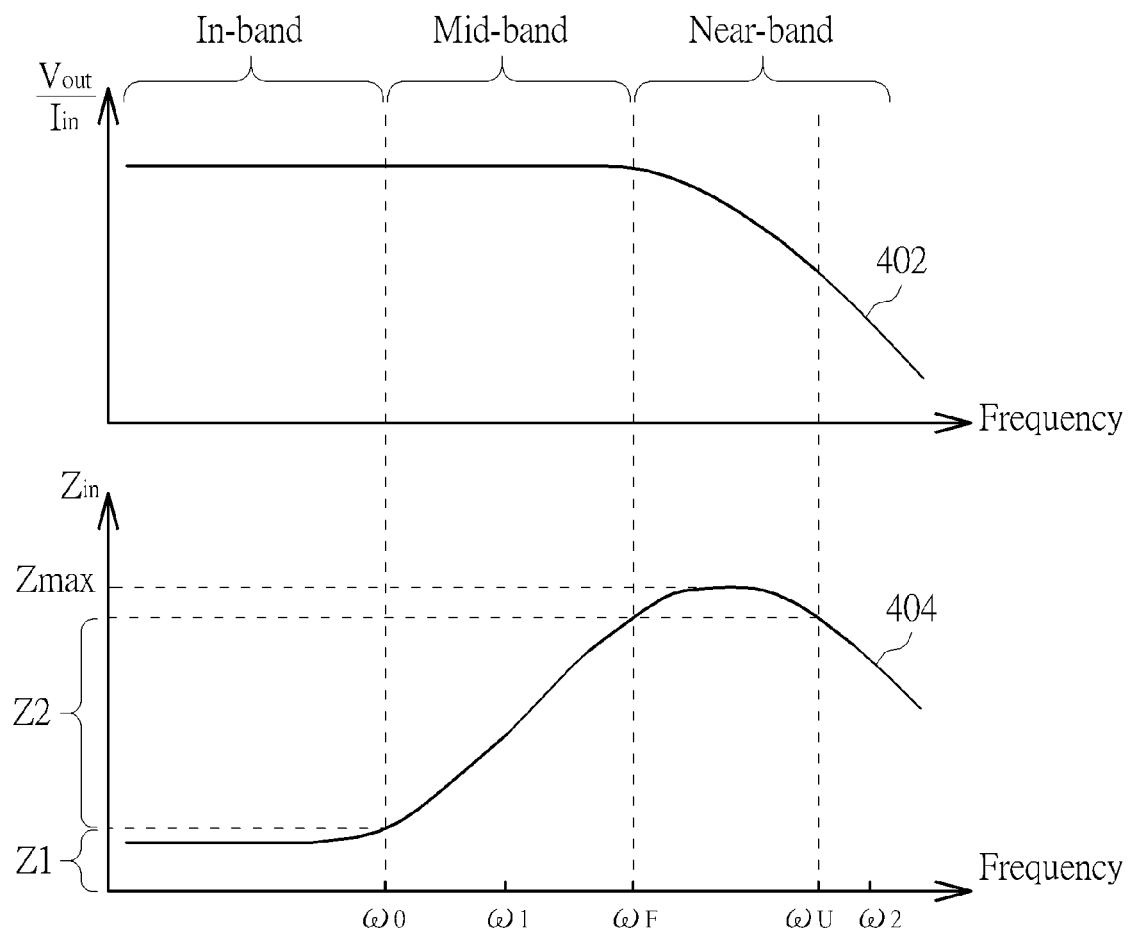
FIG. 4 is a diagram illustrating a frequency response of the second amplifying device according to an embodiment of the present invention.

In other words, the capacitance at the input terminal N2 is increased by the Miller Effect of the first amplifying device 112 in the high frequency range. More specifically, the gain of the first amplifying device 112 is $g_mZ_{in}$. In the frequency lower than the specific frequency $\omega_2$, the gain $g_mZ_{in}$ is very small because the input impedance $Z_{in}$ is still small as shown in FIG. 4. Therefore, the capacitance at the input terminal N2 can be regarded as $C_1$ in the frequency lower than the specific frequency $\omega_1$. In the frequency between the specific frequencies $\omega_1$ and $\omega_2$, the gain $g_mZ_{in}$ becomes large because the input impedance $Z_{in}$ is large enough in this frequency range. Therefore, the capacitance at the input terminal N2 is $C_1(1+g_mZ_{1n})$ in the frequency between the specific frequency $\omega_1$ and $\omega_2$. Then, in the frequency higher than the specific frequency $\omega_2$, the gain $g_mZ_{in}$ decreases again as shown in FIG. 4. Therefore, the capacitance at the input terminal N2 can be regarded as $C_1$ again in the frequency higher than the specific frequency $\omega_2$. According to the equations (5)-(7), it can be seen that the capacitance at the input terminal N2 is enlarge in the frequency between the specific frequencies $\omega_1$ and $\omega_2$, which means that the capacitor (i.e. $C_1$) and the capacitive device 110 can be designed to have small capacitances but still can obtain the large capacitance effect at the input terminal N2. Therefore, the area occupied by the capacitor (i.e. $C_1$) and the capacitive device 110 is reduced in comparison to the conventional counterpart.

In the lower diagram of FIG. 6, it can be seen that the bandwidth (i.e. 604) of the combination circuit of the first amplifying device 112, the second amplifying device 114, the feedback device 116, and the capacitive device 110 (i.e. the cascaded amplifiers in FIG. 5) is extended by a specific bandwidth BW1 such that the SNR of the signal in channel edge does not reduce. In addition, the gain reduces sharply when the frequency reaches the near-band frequency. In comparison to the bandwidth of the conventional counterpart that is labeled by 606, the present circuit not only has a large bandwidth but also sharp adjacent-band rejection as shown in FIG. 6.

It should be noted that the signal receiving apparatus 100 illustrating as a single-ended circuit in FIG. 1 is only for the description purpose, and this is not a limitation of the present invention. The signal receiving apparatus 100 may be a differential circuit in another embodiment of the present invention. Please refer to FIG. 7, which is a diagram illustrating a signal receiving apparatus 700 according to a second embodiment of the present invention. The signal receiving apparatus 700 is a differential wireless signal receiver. The signal receiving apparatus 700 comprises an antenna 702, a matching network 704, a capacitive device 706, a mixing device 708, a first capacitive device 710, a second capacitive device 712, a first differential amplifying device 714, a second differential amplifying device 716, a first feedback device 718, and a second feedback device 720. The circuit components in the right side of the chip connecting port Np' are implemented as a single-chip. The circuit components (i.e. the antenna 702 and the matching network 704) in the left side of the chip connecting port Np' are external to the single-chip.

The first differential amplifying device 714 is a differential trans-conductance circuit. The first differential amplifying device 714 comprises a differential trans-conductance circuit 7142, a first feedback circuit 7144, and a second feedback circuit 7146. The second differential amplifying device 716 comprises a differential trans-impedance circuit 7162, a first feedback circuit 7164, and a second feedback circuit 7166. According to this embodiment, each of the feedback circuits 7144, 7146, 7164, 7168, and the feedback devices 718, 720 is a combination circuit of capacitive elements, inductive elements, resistive elements, and/or transistors.

Figure 7:
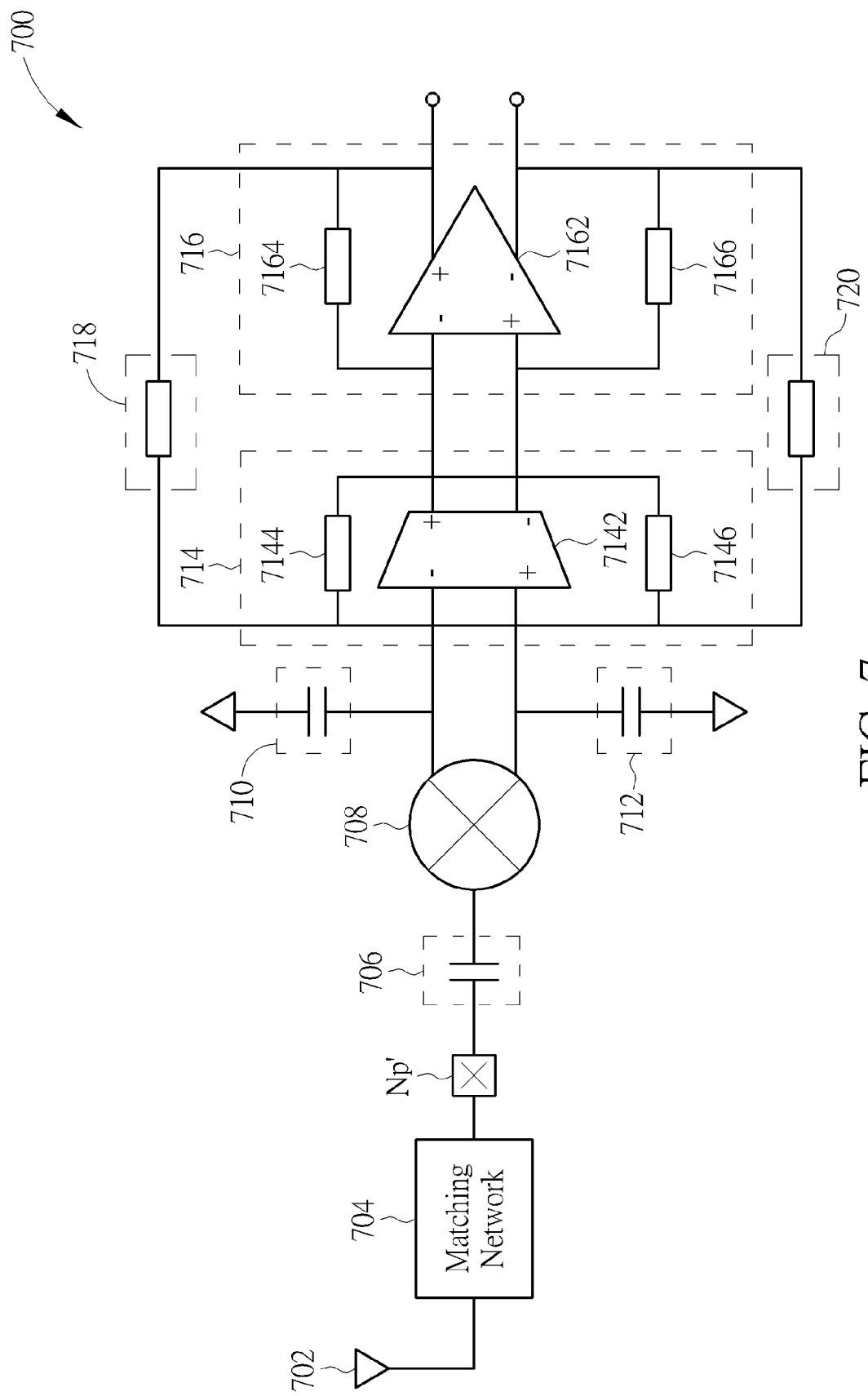
FIG. 7 is a diagram illustrating a signal receiving apparatus according to a second embodiment of the present invention.

The connection among the circuit components of the signal receiving apparatus 700 is shown in FIG. 7, thus the detailed description is omitted here for brevity.

It is noted that, the signal receiving apparatus 700 is a differential version of the signal receiving apparatus 100. Therefore, the signal receiving apparatus 700 may also have the similar advantages or characteristics of the signal receiving apparatus 100. Those skilled in the art are appreciated to understand the operation of the signal receiving apparatus 700 after reading the above description related to the signal receiving apparatus 100, thus the detailed description is omitted here for brevity.

Figure 8:
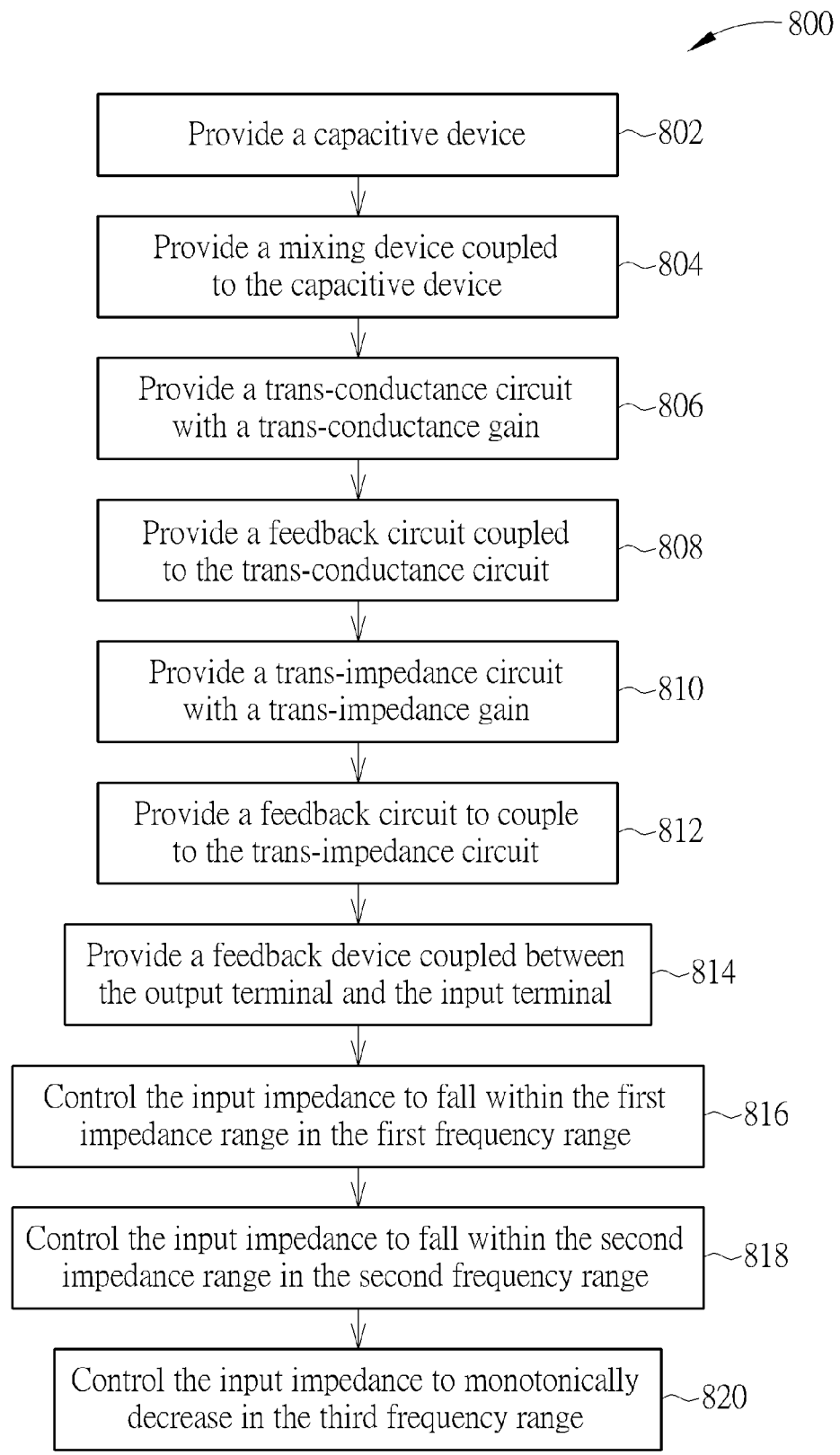
FIG. 8 is a flowchart illustrating a signal receiving method according to an embodiment of the present invention.

In conclusion, the operation of the above signal receiving apparatuses 100, 700 can be summarized into the procedure as shown in FIG. 8. FIG. 8 is a flowchart illustrating a signal receiving method 800 according to an embodiment of the present invention. Provided that substantially the same result is achieved, the steps of the flowchart shown in FIG. 8 need not be in the exact order shown and need not be contiguous, that is, other steps can be intermediate. The signal receiving method 800 comprises:

Step 802: Provide the capacitive device 106 having the first terminal coupled to the chip connecting port Np;

Step 804: Provide the mixing device 108 having the input terminal N1 coupled to the second terminal of the capacitive device 106 and the output terminal coupled to the input terminal N2 of the first amplifying device 112;

Step 806: Provide the trans-conductance circuit 1122 to provide a trans-conductance gain from the input terminal N2 to the output terminal N3;

Step 808: Provide the feedback circuit 1124 to couple between the input terminal N2 and the output terminal N3;

Step 810: Provide the trans-impedance circuit 1142 to provide a trans-impedance gain from the input terminal N3 to the output terminal No;

Step 812: Provide the feedback circuit 114 to couple between the input terminal N3 and the output terminal No;

Step 814: Provide the feedback device 116 to couple between the output terminal No and the input terminal N2;

Step 816: Control the second amplifying device 114 to provide the input impedance looking into the input terminal N3 of the second amplifying device 114 to fall within the first impedance range Z1 when the second amplifying device 114 operates in the first frequency range;

Step 818: Control the second amplifying device 114 to provide the input impedance looking into the input terminal N3 of the second amplifying device 114 to fall within the second impedance range Z2 when the second amplifying device operates in the second frequency range, wherein the second frequency range is higher than the first frequency range, and the second impedance range Z2 is larger than the first impedance range Z1; and Step 820: Control the input impedance looking into the input terminal N3 of the second amplifying device 114 to monotonically decrease in the third frequency range higher than the second frequency range.

Briefly, the present signal receiving apparatus is a mixer-first receiver, and the signal receiving apparatus provides a trans-impedance circuit to connect to an output terminal of an trans-conductance circuit such that the Miller Effect of the trans-conductance circuit enlarges the capacitance at the input terminal of the trans-conductance circuit. By doing this, a small capacitor, instead of a large capacitor, can be used to connect to the input terminal of the trans-conductance circuit for providing a band-pass filtering effect for the receiving signal. Moreover, the signal receiving apparatus also has the characteristic of flat in-band response and sharp adjacent-band rejection.

By way of example, but not limitation, a SAW-less receiver 100/700 may be realized when the mixing device 108/708 is implemented using a passive mixer. As shown in FIG. 6, the combination circuit of the first amplifying device 112, the second amplifying device 114, the feedback device 116, and the capacitive device 110 may be regarded as having a low-pass filter (LPF) frequency response. When the mixing device 108/708 is implemented using a passive mixer, the LPF frequency response is translated from the baseband side to the RF side through the passive mixer, thus creating a band-pass filter (BPF) frequency response centered at a local oscillator (LO) frequency used by the passive filter. For example, when an LPF frequency response is present at the output terminal N2 of the mixing device 108, a BPF frequency response is present at the input terminal N1 of the mixing device 108 to reject/attenuate the unwanted out-of-band blocker signals. With a proper frequency response design of the combination circuit of the first amplifying device 112, the second amplifying device 114, the feedback device 116, and the capacitive device 110, a SAW (Surface Acoustic Wave) filter may be omitted in the RF front-end. Further, a low-noise amplifier (LNA) coupled between a passive mixer and a chip connecting port may also be omitted. As shown in FIG. 1/FIG. 7, a first terminal of the capacitive device 106/706 is directly connected to the chip connecting port Np/Np', and a second terminal of the capacitive device 106/706 is directly connected to the input terminal of the mixing device 108/708.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal receiving apparatus, comprising:
an amplifying device, having an input terminal and an output terminal;
an amplifying circuit, having an input terminal and an output terminal, wherein the input terminal of the amplifying circuit is coupled to the output terminal of the amplifying device;
a feedback device, coupled between the output terminal of the amplifying circuit and the input terminal of the amplifying device; and
a mixing device, having an input terminal coupled to a chip connecting port and an output terminal coupled to the input terminal of the amplifying device;
wherein the mixing device is a passive mixer, the amplifying circuit is arranged to provide an input impedance looking into the input terminal of the amplifying circuit to fall within a first impedance range when the amplifying circuit operates in a first frequency range, the amplifying circuit is arranged to provide the input impedance looking into the input terminal of the amplifying circuit to fall within a second impedance range when the amplifying circuit operates in a second frequency range, the second frequency range is different from the first frequency range, and the second impedance range is different from the first impedance range.

2. The signal receiving apparatus of claim 1, wherein the second frequency range is higher than the first frequency range, and the second impedance range is larger than the first impedance range.

3. The signal receiving apparatus of claim 2, wherein when the amplifying circuit operates in the first frequency range, the input impedance looking into the input terminal of the amplifying circuit substantially keeps intact.

4. The signal receiving apparatus of claim 2, wherein when the amplifying circuit operates in the second frequency range, the input impedance looking into the input terminal of the amplifying circuit monotonically increase in respect to a frequency.

5. The signal receiving apparatus of claim 2, wherein when the amplifying circuit operates in a third frequency range, the input impedance looking into the input terminal of the amplifying circuit monotonically decrease in respect to a frequency, and the third frequency range is higher than the second frequency range.

6. The signal receiving apparatus of claim 1, wherein the amplifying device comprises:

a trans-conductance circuit, arranged to provide a trans-conductance gain from the input terminal of the amplifying device to the output terminal of the amplifying device; and
a feedback circuit, coupled between the input terminal and the output terminal of the amplifying device.

7. The signal receiving apparatus of claim 6, wherein the feedback circuit at least comprises a capacitive element.

8. The signal receiving apparatus of claim 1, wherein the amplifying circuit comprises:
a trans-impedance circuit, arranged to provide a trans-impedance gain from the input terminal of the amplifying circuit to the output terminal of the amplifying circuit; and
a feedback circuit, coupled between the input terminal and the output terminal of the amplifying circuit.

9. The signal receiving apparatus of claim 8, wherein the feedback circuit at least comprises:
a capacitive element, coupled between the input terminal and the output terminal of the amplifying circuit; and
a resistive element, coupled between the input terminal and the output terminal of the amplifying circuit.

10. The signal receiving apparatus of claim 1, wherein the feedback device at least comprises:
an inverting circuit, having an input terminal coupled to the output terminal of the amplifying circuit; and
a resistive circuit, having a first terminal coupled to an output terminal of the inverting circuit and a second terminal coupled to the input terminal of the amplifying device.

11. The signal receiving apparatus of claim 1, further comprising:
a first capacitive device, having a first terminal coupled to the input terminal of the amplifying device and a second terminal coupled to a reference voltage.

12. The signal receiving apparatus of claim 1, further comprising:
a second capacitive device, having a first terminal directly connected to the chip connecting port, and a second terminal directly connected to the input terminal of the mixing device.

13. The signal receiving apparatus of claim 12, further comprising:
a matching network, having a first terminal coupled to the chip connecting port.

14. The signal receiving apparatus of claim 13, further comprising:
an antenna, coupled to a second terminal of the matching network for receiving a wireless signal.

15. A signal receiving method, comprising:
providing a first amplifying device having an input terminal and an output terminal;
providing a second amplifying device having an input terminal and an output terminal, wherein the input terminal of the second amplifying device is coupled to the output terminal of the first amplifying device;
providing a feedback device to couple between the output terminal of the second amplifying device and the input terminal of the first amplifying device;
providing a mixing device having an input terminal coupled to a chip connecting port and an output terminal coupled to the input terminal of the first amplifying device, wherein the mixing device is a passive mixer;
controlling the second amplifying device to provide an input impedance looking into the input terminal of the second amplifying device to fall within a first impedance range when the second amplifying device operates in a first frequency range; and controlling the second amplifying device to provide the input impedance looking into the input terminal of the second amplifying device to fall within a second impedance range when the second amplifying device operates in a second frequency range;

wherein the second frequency range is different from the first frequency range, and the second impedance range is different from the first impedance range.

16. The signal receiving method of claim 15, wherein the second frequency range is higher than the first frequency range, and the second impedance range is larger than the first impedance range.

17. The signal receiving method of claim 16, wherein when the second amplifying device operates in the first frequency range, the input impedance looking into the input terminal of the second amplifying device substantially keeps intact.

18. The signal receiving method of claim 16, wherein when the second amplifying device operates in the second frequency range, the input impedance looking into the input terminal of the second amplifying device monotonically increase in respect to a frequency.

19. The signal receiving method of claim 16, wherein when the second amplifying device operates in a third frequency range, the input impedance looking into the input terminal of the second amplifying device monotonically decrease in respect to a frequency, and the third frequency range is higher than the second frequency range.

20. The signal receiving method of claim 15, wherein providing the first amplifying device having the input terminal and the output terminal comprises:

providing a trans-conductance circuit to provide a trans-conductance gain from the input terminal of the first amplifying device to the output terminal of the first amplifying device; and providing a feedback circuit to couple between the input terminal and the output terminal of the first amplifying device.

21. The signal receiving method of claim 15, wherein providing the second amplifying device having the input terminal and the output terminal comprises:

providing a trans-impedance circuit to provide a trans-impedance gain from the input terminal of the second amplifying device to the output terminal of the second amplifying device; and providing a feedback circuit to couple between the input terminal and the output terminal of the second amplifying device.

22. The signal receiving method of claim 15, further comprising:

providing a capacitive device having a first terminal directly connected to the chip connecting port and a second terminal directly connected to the input terminal of the mixing device.

23. The signal receiving method of claim 22, further comprising:

providing a matching network having a first terminal coupled to the chip connecting port.

24. The signal receiving method of claim 23, further comprising:

providing an antenna to couple to a second terminal of the matching network for receiving a wireless signal.

* * * * *